United States Patent [19]

Martinez

[11] Patent Number: 5,284,060

[45] Date of Patent: Feb. 8, 1994

[54] PRESSURE/CONTROL GAGE

[76] Inventor: Donald G. Martinez, P.O. Box 584, Calistoga, Calif. 94515

[21] Appl. No.: 991,495

[22] Filed: Dec. 17, 1992

Related U.S. Application Data

[63] Continuation of Ser. No. 845,546, Mar. 4, 1992, abandoned, which is a continuation of Ser. No. 325,623, Mar. 20, 1989, abandoned.

[51] Int. Cl.$^5$ .............................................. G01L 9/00
[52] U.S. Cl. .......................................... 73/707; 73/723
[58] Field of Search ............... 73/723, 715, 717, 706, 73/707, 747, 749, 750, 714, 756

[56] References Cited

U.S. PATENT DOCUMENTS

| | | | |
|---|---|---|---|
| 464,576 | 12/1891 | Masters | 73/715 |
| 1,377,220 | 5/1921 | Nye | 73/715 |
| 3,477,464 | 11/1969 | Ryan | 73/707 |
| 3,901,038 | 8/1975 | Wallace | 73/715 |

FOREIGN PATENT DOCUMENTS 0191408 2/1923 United Kingdom ............. 73/723

Primary Examiner—Donald O. Woodiel
Attorney, Agent, or Firm—Townsend & Townsend Khourie & Crew

[57] ABSTRACT

A pressure/control gage (12) includes a housing (4) defining an elongate, generally funnel shaped fluid chamber (6) having an open end (8) at the base of the fluid chamber. The open end is sealed by a diaphragm (10). The sealed fluid chamber includes a liquid (26), such as mercury, and a gas (28) defining an interface (30) between the two. The liquid is positioned against the inner surface (20) of the diaphragm. The outer surface (22) of the diaphragm is coupled to a source of pressure (18). The location of the interface changes according to the pressure applied to the outer surface of the diaphragm. Preferably the housing is clear, so the interface can be visually observed, with visual markings (32, 34) indicating the pressure. Also disclosed is a novel surge control valve (40) in which a resilient material (42) is positioned transversely across the fluid passageway (24) connecting the pressure source and the diaphragm. A control screw (48) is used to compress the resilient material to create a variable restriction (52) in the passageway thus inhibiting the effects of pressure surges on the diaphragm.

15 Claims, 1 Drawing Sheet

PRESSURE/CONTROL GAGE

This is a continuation of patent application Ser. No. 07/845,546, filed Mar. 4, 1992, now abandoned which is a continuation of patent application Ser. No. 07/325,623, filed Mar. 20, 1989, now abandoned.

BACKGROUND OF THE INVENTION

Pressure measurement is often critical to many industrial processes. There is a wide range of devices used to measure pressure. Many pressure gages use some type of metallic element which moves according to pressure applied. This movement is typically relayed through a mechanical linkage to move a pointer across a dial on the pressure gage. These types of pressure gages have many drawbacks when used in industrial settings, especially out of doors and in areas of rough handling. In such environments pressure gages have a tendency to fail, especially when subject to abuse. Also, many pressure gages, by their very nature, are accurate only within a relatively narrow range and are sensitive to being subjected to over pressurization, which can damage or destroy the gage.

Accordingly, what is needed is a pressure gage which is relatively simple in construction, reliable even under adverse conditions, generally insensitive to overpressure conditions and accurate over its entire range.

SUMMARY OF THE INVENTION

The present invention is directed to a pressure/control gage which uses virtually no linkages or other mechanical moving parts, which is insensitive to overpressure, which is a sealed system requiring no calibrations or adjustments, and is relatively inexpensive to make while providing true readings over its entire range.

The gage includes a housing defining an elongate, preferably funnel shaped, fluid chamber having an open end at one end of the fluid chamber. The open end is sealed by a movable seal so that fluid chamber is sealed from the ambient environment. The fluid chamber is filled with a liquid and a gas which define an interface between the two. The liquid is positioned at that portion of the fluid chamber adjacent a first, inner surface of the movable seal.

Pressure is applied to a second, outer surface of the movable seal from a pressure source to deflect the movable seal. The location of the interface between the gas and liquid changes according to the volume of the gas in the gage and thus the value of the pressure applied to the second surface of the movable seal.

Preferably the housing is clear so the interface can be visually observed. The housing also preferably has visual markings indicating the pressure applied to the second surface of the seal. The fluid chamber may be configured so the pressure markings are equally spaced at regular pressure intervals.

Also disclosed is a novel surge control valve used in a fluid passageway connecting the pressure source and the second, outer surface of the movable seal. The surge control valve includes a resilient material positioned transversely across a fluid passageway. The material is selected and sized so that compressing the material tends to fill the passageway with the material.

The only moving mechanical part with the invention is the diaphragm or other movable fluid seal, which covers the open end of the fluid chamber. This eliminates many of the problems, as well as expense, associated with expansible metallic element gages, such as Bourdon tube gages, diaphragm element gages and bellows element gages. The gage is generally insensitive to over pressurization, subject only to the strength of the housing defining the fluid chamber. Since the size and shape of the fluid chamber can be made with great accuracy, one only needs to accurately measure the liquid introduced into the fluid chamber to create an accurate gage. Since there is no appreciable frictional resistance, as can occur with standard expansible metallic element gages, the gage is accurate at low pressures as well as at high pressures. Since the gage is sealed from the atmosphere, atmospheric contamination is not a problem.

The fluid chamber is preferably configured to provide linear pressure measurement along its length. That is, the axial distance between 20 psi and 30 psi is, in the preferred embodiment, the same as the axial distance between 80 psi and 90 psi. However, the fluid chamber could be sized to provide virtually any combination of expanded or contracted scales. For example, the scale could be linear over a portion of the range, logarithmic over a second portion of the range and linear over a third and final portion of the range, the third portion being at a reduced spacing when compared with the first portion. Through the appropriate configuration of the fluid chamber, the invention may be used to sense both positive and negative gage pressures.

When the housing is made of a transparent or translucent material, the gage can be visually read. By appropriately configuring the housing, such as making the housing cylindrical, the size of the fluid chamber is magnified for ease of viewing by the user.

The invention preferably includes a surge control valve between the source of pressure and the diaphragm. This surge control valve eliminates the need for costly and cumbersome surge control tanks by damping oscillations in the pressure applied to the second surface of the diaphragm. The surge control valve includes a section of rubber or rubber like material positioned within a transverse bore passing transversely through a fluid passageway, the fluid passageway coupling the second surface of the diaphragm with the line pressure port. A control screw is mounted within a threaded hole coaxially with the transverse bore to apply a compressive force to the resilient valve element thus adjusting the amount the valve element expands into and thus the degree the valve element blocks, the fluid passageway. The surge valve has no valve seat to wear out, is simple and inexpensive in construction and can be adjusted or controlled from the side, that is transverse to the fluid passageway. In this way, deleterious effects caused by pressure surges from the source of pressure can be substantially eliminated in a simple and inexpensive manner.

The invention can also be used as a part of a pressure-responsive, electrical control system. For example, using an electrically conductive liquid, such as mercury, and any number of terminals positioned along the fluid chamber, the position of the interface between the liquid and gas can be sensed directly. This information can be used, for example, to provide a digital readout of the pressure or to operate various pumps, valves or other equipment. Instead of individual terminals, a resistive strip could be positioned along the length of the fluid chamber so that the resistance between one end of the strip and the conductive liquid varies according to the pressure. Of course methods for remotely sensing the position of the interface can be used as well.

Other features and advantages of the invention will appear from the following description in which the preferred embodiments have been set forth in detail in conjunction with the accompanying drawings.

DETAILED DESCRIPTION OF THE PREFERRED EMBODIMENTS

Figure 1:
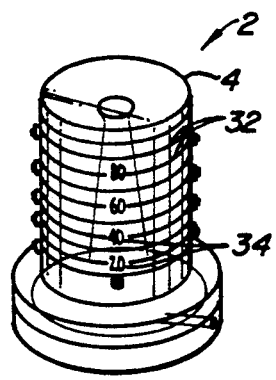
FIG. 1 is an isometric view of a pressure/control gage made according to the invention.
Figure 2:
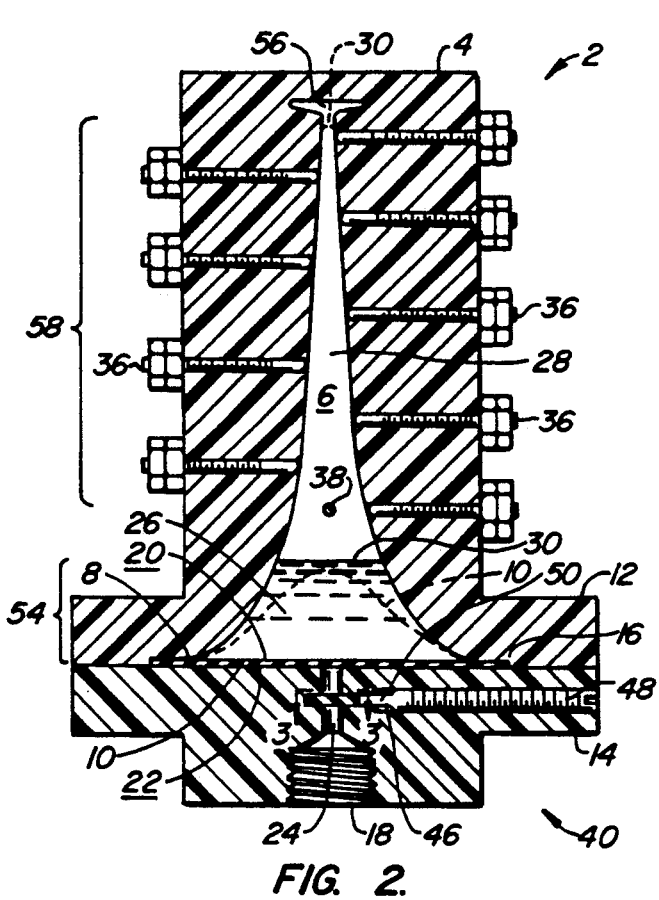
FIG. 2 is an enlarged axial cross-sectional view of the gage of FIG. 1.

Referring now to FIGS. 1 and 2, a pressure/control gage 2 is shown to include a cylindrical housing 4 made of a clear plastic material, such as acrylic, and defining a fluid chamber 6 therein. Fluid chamber 6 is funnel shaped having an open bottom end 8 sealed by a diaphragm 10 to create a sealed fluid chamber 6.

Housing 4 includes an upper portion 12, defining fluid chamber 6, and a lower portion 14 secured to an upper portion to capture the periphery 16 of diaphragm 10 therebetween. Lower portion 14 also includes a line pressure port 18 which acts as a source of pressure. Diaphragm 10 includes a first, inner surface 20 facing fluid chamber 6 and a second, outer surface 22, opposite first surface 20. Port 18 is fluidly coupled to second surface 22 through a fluid passageway 24.

Fluid chamber 6 includes an incompressible liquid 26, preferably mercury, and a compressible gas 28, such as nitrogen or carbon dioxide. Liquid 26 and gas 28 define an interface 30. The position of interface 30 moves according to the pressure at port 18, and thus the pressure applied to second surface 22. Since cylindrical housing 4 is clear, the user can see interface 30 through the side of the housing. The cylindrical shape of housing 4 magnifies the size of fluid chamber to aid viewing.

Upper portion 12 of housing 4 includes a number of pressure measurement lines 32 which, together with pressure indicia 34 marked on the side of upper portion 12, permit the user to visually ascertain the gage pressure at port 18. In the preferred embodiment fluid chamber 6 is sized so that pressure measurement lines 32 from 10 psi through 90 psi are evenly positioned along the axial length of fluid chamber 6. Doing so results in the funnel shaped fluid chamber 6 shown in FIG. 2.

In FIG. 2, interface 30 is shown at zero gage pressure, that is with only atmospheric pressure applied to port 18. The dashed line position of diaphragm 10 and interface 30 illustrate the positions of the diaphragm and the interface when 90 psig is applied to port 18.

Diaphragm 10 is preferably sufficiently extensible so that the pressure on inner and outer surfaces 20, 22 are about equal even when the gage 10 is fully pressurized. That is, by making diaphragm 10 easily extensible, the tension within the material of the diaphragm is minimized so the diaphragm does not oppose the pressure force exerted on outer surface 22 to any significant extent.

The preferred embodiment also includes a number of electrical terminals 36 which contact liquid 26 as the liquid rises within fluid chamber 6. A common terminal 38 is also included. Terminals 36 are, in the preferred embodiment positioned at 10 psi increments and are commonly used to control the operation of various pumps in an irrigation system to insure proper pressure is maintained. Of course other numbers and spacings of terminals 36 could be used for any number of purposes.

The choice of materials for liquid 26 and gas 28 depends upon several factors. If terminals such as terminals 36, 38 are used, the liquid must be electrically conductive, such as mercury. However, gas 28 should not dissolve into liquid 26, except in insignificant amounts.

Figure 3:
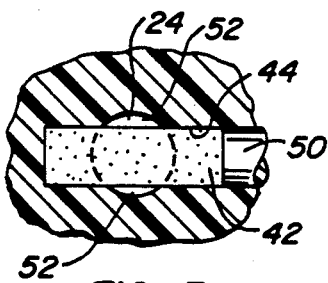
FIG. 3 is an enlarged view taken along little 3—3 of FIG. 2 showing the resilient valve element of the surge control valve.

Referring now also to FIG. 3, gage 2 is seen to include a surge control valve 40. Valve 40 includes a resilient valve element 42, typically a cylindrical length of rubber, the ends of which are housing within a transverse bore 44 formed to intersect fluid passageway 24. FIG. 3 shows element 42 in its uncompressed state so as to not completely fill fluid passageway 24. Surge control valve 40 also includes a threaded hole 46 in lower portion 14 of housing 4 within which a control screw 48 is mounted. Control screw 48 includes an end 50 which presses against resilient valve element 42 to apply a compressive force to the valve element. Doing so causes resilient valve element 42 to expand into fluid passageway 24 thus narrowing the gaps 52 between element 42 and the walls of fluid passageway 24. The adjustment is made so that fluctuations, especially large or sudden surges, in the pressure at line pressure port 18 are moderated and thus not apply directly to second surface 22 of diaphragm 10. Of course if monitoring for pressure surges and such is desired, surge control valve 40 may be dispensed with.

In use the user couples line pressure port 18 to a pressure source with pressure gage 2 in the upright position of FIGS. 1 and 2. Control screw 48 is adjusted to achieve appropriate damping of pressure surges. In a strictly manual mode, the user visually observes interface 30 relative to lines 32 to determine the pressure at port 18. Appropriate ones of terminals 36, 38 are connected to appropriate control elements if the automatic or semiautomatic control or monitoring, depending upon the pressure at port 18, is desired.

At its narrowest fluid chamber 6 is, in the preferred embodiment, only about 0.125 inch in diameter. Due to capillary action, liquid 26 may have a tendency to remain within the narrow section of fluid chamber 6, especially when gas 28 and liquid 26 have become mixed, such as during transport. To help eliminate this and return all liquid 26 to the liquid supply portion 54 of fluid chamber 6, a broad, generally funnel shaped separation chamber portion 56 of fluid chamber 6 is situated above the upper most portion of the pressure measurement portion 58 of fluid chamber 6. Doing so permits the user to shake down any liquid 26 which may become trapped in the uppermost regions of pressure measurement portion 28 or in the separation chamber portion 56 of fluid chamber 6.

Figure 4:
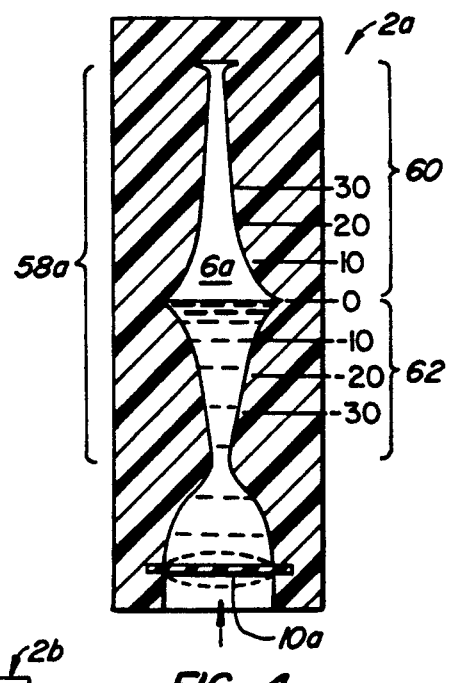
FIG. 4 is a simplified side view of a gage made according to the invention suitable for measuring positive and negative gage pressures.

Referring now to FIG. 4, a simplified view of an alternative embodiment of the invention suitable for measuring both positive and negative gage pressures is shown. As indicated, the pressure measurement portion 58a of gage 2a includes both a positive pressure portion 60 and a negative pressure portion 62. Diaphragm 10a is positioned and supported so that it can be deflected towards fluid chamber 6a or away from fluid chamber 6a as shown by the dashed lines in FIG. 4.

Figure 5:
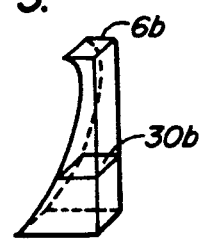
FIGS. 5 and 6 show an alternative shape of a fluid chamber in which the fluid chamber presents an elongate, constant width shape to the viewer.
Figure 6:
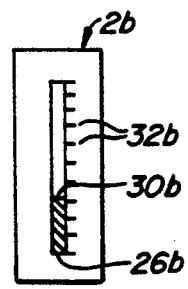

In some circumstances it may be desirable to have a constant width liquid column for ease of viewing and perhaps for space constraints. FIG. 5 illustrates in a simplified form the shape of such a fluid chamber 6b with FIG. 6 illustrating what a gage 2b including chamber 6b would look like from the perspective of the viewer.

Other modifications and variation can be made to the disclosed embodiments without departing from the subject of the invention as defined in the following claims. For example, in some situations, such as if pressure measurement portion 58 of fluid chamber 6 were thin enough so that the capillary action between liquid 26 and the walls of chamber 6 would keep the liquid and gas from mixing, a pressure gage made according to the invention could be used in orientations other than the vertical one shown in the preferred embodiment. Although the disclosed embodiments illustrate gages in which fluid chambers have been configured to provide linear pressure gages, the fluid chambers could be configured to provide other pressure gage scales. For example, a portion of the scale between 40 and 60 psi, if of special interest, could be expanded relative to the portions of the scales above and below those values. Also, the invention could be used with fiber optic sensors to sense the interface of the liquid and gas or proximity sensors to do the same.

What is claimed is:

1. A pressure gage for measuring the pressure at a source of pressure comprising:
   a housing defining a fluid chamber having an open end;
   a movable seal covering the open end so to seal the fluid chamber, the seal having a first surface facing the fluid chamber and a second surface;
   the fluid chamber containing a liquid and a gas, the liquid and gas defining an interface therebetween; and
   a fluid passageway, including an intermediate portion, fluidly coupling the source of pressure and the second surface so the second surface is subjected to the pressure causing the movable seal to be deflected thus changing the location of the interface according to the pressure; and
   a surge control valve positioned along the fluid passageway, the surge control valve including:
   a resilient valve element having a first part positioned transversely within the intermediate portion and having a second part positioned within a transverse bore opening into said intermediate portion;
   a control element contacting the second part of the resilient valve element to apply a compressive force on the resilient valve element; and
   the first part of the resilient valve element being sized to provide a desired partial obstruction to said fluid passageway when placed in a desired compressive state by the control element applying a compressive force on the resilient valve element.

2. The pressure gage of claim 1 wherein said control element includes a control screw positioned coaxially with the transverse bore.

3. The pressure gage of claim 1 wherein the fluid chamber includes an enlarged separation portion at the second end of the fluid chamber, the separation portion expanding outwardly from the second end, the separation portion sized and shaped to permit any of the liquid which may enter the separation portion to be urged out of the separation portion and back towards the liquid supply portion.

4. The pressure gage of claim 1 wherein the fluid chamber is vertically oriented.

5. The pressure gage of claim 1 wherein the movable seal includes a diaphragm.

6. A pressure gage for measuring the pressure at a source of pressure comprising:
   a housing defining a vertically oriented, elongate fluid chamber having an open lower end;
   the fluid chamber including a liquid supply portion adjacent the open end and a pressure measurement portion above the liquid supply portion;
   a movable seal covering the open end so to seal the fluid chamber, the seal having a first surface facing the fluid chamber and a second surface opposite the first surface;
   the fluid chamber containing a liquid and a gas, the liquid and gas defining an interface therebetween;
   the fluid chamber including an enlarged separation portion, the pressure measurement portion being between the liquid supply portion and the separation portion, the separation portion expanding outwardly from the pressure measurement portion, the separation portion sized and shaped to permit any of the liquid which may enter the separation portion to be urged out of the separation portion and back towards the liquid supply portion;
   a fluid passageway fluidly coupling the source of pressure and the second surface so the second surface is subjected to the pressure causing the movable seal to be deflected thus changing the location of the interface according to the pressure, the liquid substantially filling the liquid supply portion when the gage pressure is about zero; and
   the pressure measurement portion including a length and being sized so that the interface moves along the length in direct proportion to the pressure.

7. The pressure gage of claim 6 wherein the fluid chamber is an elongate funnel-shaped region.

8. The pressure gage of claim 6 wherein the housing incudes a viewing portion providing visual access to at least a portion of the fluid chamber so to provide a user with visual access to the position of the interface.

9. The pressure gage of claim 8 wherein the liquid is mercury.

10. The pressure gage of claim 8 further comprising electrical contacts positioned along the fluid chamber to permit electrical sensing of the position of said interface.

11. The pressure gage of claim 6 wherein the movable seal is deflectable toward and away from said fluid chamber.

12. The pressure gage of claim 6 wherein the liquid is an electrically conductive liquid.

13. The pressure gage of claim 6 further comprising means for electrically sensing the position of said interface along the fluid chamber.

14. The pressure gage of claim 6 further comprising a surge control valve positioned along the fluid passageway.

15. A surge control valve, for use between a source of pressure and a pressure gage, for moderating pressure surges from the source of pressure;

a body including a fluid passageway coupled to the pressure gage and the source of pressure and a transverse bore opening into the fluid passageway;

a resilient valve element having a first part positioned transversely within the fluid passageway and having a second part positioned within the transverse bore;

a control element contacting the second part of the resilient valve element to apply a compressive force on the resilient valve element; and the first part of the resilient valve element being sized to provide a desire partial obstruction to said fluid passageway when placed in a desired compressive state by the control element applying a compressive force on the resilient valve element.

* * * * *